US008857759B2

(12) United States Patent
Yurchak

(10) Patent No.: US 8,857,759 B2
(45) Date of Patent: Oct. 14, 2014

(54) CONE TOWER BASED FACILITY AND METHOD FOR LAUNCHING AN ATMOSPHERIC SOUNDING DEVICE UNDER STRONG WINDS

(76) Inventor: Boris S. Yurchak, Gaithersburg, MD (US)

( * ) Notice: Subject to any disclaimer, the term of this patent is extended or adjusted under 35 U.S.C. 154(b) by 437 days.

(21) Appl. No.: 13/448,394

(22) Filed: Apr. 17, 2012

(65) Prior Publication Data
US 2013/0270388 A1  Oct. 17, 2013

(51) Int. Cl.
*B64B 1/40* (2006.01)
(52) U.S. Cl.
USPC ............................................ 244/31; 244/1 TD
(58) Field of Classification Search
USPC ............. 244/31, 1 TD, 33; 446/220; 116/210
See application file for complete search history.

(56) References Cited

U.S. PATENT DOCUMENTS

| | | | | |
|---|---|---|---|---|
| 2,492,800 | A | * | 12/1949 | Isom ............................... 244/31 |
| 3,781,893 | A | * | 12/1973 | Beukers et al. ................ 343/702 |
| 5,548,283 | A | * | 8/1996 | Martin ....................... 340/870.01 |
| 5,636,480 | A | | 6/1997 | Lauritsen et al. |
| 5,850,987 | A | | 12/1998 | Aurilio et al. |
| 5,850,988 | A | | 12/1998 | Aurilio et al. |
| 5,884,862 | A | | 3/1999 | Aurilio et al. |
| 5,895,010 | A | | 4/1999 | Aurilio et al. |
| 5,901,922 | A | | 5/1999 | Aurilio et al. |
| 7,275,496 | B2 | | 10/2007 | French et al. |
| 7,648,102 | B2 | | 1/2010 | French et al. |
| 2003/0027652 | A1 | | 2/2003 | Chamberlain et al. |
| 2007/0272801 | A1 | * | 11/2007 | Hilliard et al. ................. 244/142 |
| 2012/0120230 | A1 | * | 5/2012 | Wilkerson et al. ............. 348/135 |

FOREIGN PATENT DOCUMENTS

| | | |
|---|---|---|
| WO | 2010000942 | 1/2010 |
| WO | 2010611034 | 6/2010 |

OTHER PUBLICATIONS

National Weather Service Manual 10-1401. Operations and Services, Upper Air Program NWSPD 1-14, Rawinsonde Observations. May 23, 2007, p. 1, 57-68, 75, 76, 93, 94.
Leccese, M.R. Providing cutting-edge weather support in Piemonte. Vaisala News, 161, 2003, p. 10.
Vaisala ASAP Sounding Station, www.vaisala.com, pp. 1-2, 2003.
Seamen, B. The Impact of Automated Shipboard Aerological Program (ASAP) Data upon Australian Analyses. Vaisala News, 162, 2003, pp. 8-9.

(Continued)

*Primary Examiner* — Christopher P Ellis

(57) ABSTRACT

A facility and method for launching an atmospheric sounding device (ASD) under strong winds are provided. The ASD includes an instrumental box connected to a balloon through a string. To avoid collision with the ground, the ASD is launched from the top of a cone tower by means of at least one sliding loop connected to the ASD and fitted around the cone tower. The loop connected to the string slides off from the top of the cone tower thereby releasing the ASD into a free flight. In one embodiment, the lower portion of the cone tower is placed inside a shelter protecting an operator from strong winds at all stages of the ASD launch. The shelter has a sliding roof with an opening to enable release of the ASD into a free flight by means of the cone tower in communication with two sliding loops.

19 Claims, 10 Drawing Sheets

(56) References Cited

OTHER PUBLICATIONS

Petersen, R.A., Blackmore, W. H. Lessons Learned on Balloon Inflation and Launch Shelters. In 15th International Conference on Interactive Information and Processing Systems (IIPS) for Meteorology, Oceanography, and Hydrology, Dallas, Texas, Jan. 10-15, 1999, American Meteorological Society. (http://www.ua.nws.noaa.gov/Paper-2.htm).

Rust, W.D., Marshall, T.C. 1989, Mobile, high-wind, balloon-launching apparatus. Journal of Atmospheric and Ocean Technology, vol. 6, pp. 215-217, May 1999.

Foote, J.P., Lineberry, J.T., and B.R. Thompson. Automated Weather Balloon Radiosonde Launcher Development. Proceedings of the Eighth Atmospheric Radiation Measurement (ARM). Science Team Meeting, Mar. 1998, Tucson, Arizona, pp. 265-268.

\* cited by examiner

CONE TOWER BASED FACILITY AND METHOD FOR LAUNCHING AN ATMOSPHERIC SOUNDING DEVICE UNDER STRONG WINDS

FIELD OF THE INVENTION

The invention relates to atmospheric sounding systems and, in particular, to balloon transported sounding devices launched by means of a ground-based facility under the impact of strong surface winds.

BACKGROUND OF THE INVENTION

Measuring various atmospheric parameters and transmitting these parameters to a remotely located receiver by means of an atmospheric sounding device is well known in the art. The atmospheric sounding device (ASD) includes an instrumental box and a balloon filled with a gas lighter than air. The balloon is connected with the instrumental box or other payload through a connecting element in the form of a string. The string may include a parachute to provide for a safe landing of the payload after the balloon is destroyed high in the atmosphere.

Currently, aerological sounding is performed under light and moderate surface winds having the speed up to 12 m/s. A standard aerological station has a shelter protecting an operator from the strong wind and precipitation while the operator is filling the balloon with a gas. However, the launch of the sounding device is performed outside of the shelter, in the open. Specifically, launching the sounding device requires the operator to hold and operate the balloon and the instrumental box with his hands. Thus, launching the sounding device under strong (12-20 m/s) winds is a complex and sometimes dangerous procedure for the operator. In addition, when the launch takes place under strong surface wind, the sounding device may hit the ground and experience fatal damages.

Strong winds often occur in polar and subpolar regions, in coastal areas, and in areas with tropical cyclones. Since the launch of the sounding device from a ground-based station in a tropical cyclone area is almost impossible, dropsondes dumped from costly reconnaissance aircrafts are used to measure meteorological parameters.

To mitigate the impact of weather conditions during the launch of the sounding device, it is known to use a temporary string length regulator, hereinafter referred to as a dereeler. The dereeler is embedded into the string, between a parachute and the instrumental box, and includes additional coiled string. However, the application of the dereeler substantially complicates the launch preparation, and increases cost and weight of the sounding device. Specifically, the string in the dereeler often gets entangled or jammed as result of wind gusts. The usage of the dereeler does not protect the operator from strong winds.

Shelters having a sliding roof with a wind deflector are known and used in the art for launching sounding devices. Specifically, the sounding device is released from a shelter through an opening (hatch) in the sliding roof. However, while passing through the opening under strong winds, the balloon string, equipped with a parachute, a dereeler, and an instrumental box, often gets hooked by a ledge of an exhaust outlet of the shelter resulting in damages to the instrumental box.

A wind deflector mounted along the perimeter of the roof is disclosed in U.S. Pat. No. 5,636,480 to Lauristen et al. However, the deflector does not reduce the horizontal component of the wind speed above the open roof. As such, the method of Lauristen et al. is limited to protecting the balloon while it gets inflated, but does not enable safe pass of the sounding device through the opening under strong surface winds.

Accordingly, there is a need for a method and facility to enable the launch of an atmospheric sounding device under strong surface winds whereby avoiding potential damages to the instrumental box and protecting the operator from the strong winds. Specifically, the method and facility are needed to prevent the sounding device from hitting the ground during the launch. When a shelter is used for launching the sounding device, the method and facility are needed to prevent the string and other elements of the sounding device from getting hooked by the ledge of the opening in the sliding roof.

SUMMARY OF THE PRESENT INVENTION

This invention comprises multiple embodiments of a facility and method for launching an atmospheric sounding device under a wide range of wind conditions up to strong winds.

In one aspect of the present invention, a facility for launching an atmospheric sounding device is provided according to the first embodiment of the present invention. The facility comprises a cone tower and a loop fitted around the cone tower. The sounding device includes an instrumental box connected to an inflated balloon through a string. The loop is in communication with the string and the instrumental box. When the balloon rises, the loop and the instrumental box move along the surface of the cone tower towards the upper portion of the cone tower. At the top of the cone tower, the loop slips off the cone tower releasing the instrumental box. Thus, the facility, according to the first embodiment of the present invention, enables a launch of a sounding device into a free flight from the top of a cone tower by means of a single loop.

In yet another aspect of the present invention, a wind-shielded facility for launching an atmospheric sounding device is provided according to the second embodiment of the present invention. The facility includes a cone tower with two loops fitted around the cone tower, wherein the loops are spaced apart. The lower portion of the cone tower is placed inside a wind-shielding shelter having a sliding roof with an opening. The sounding device includes an instrumental box connected to a balloon through a string. The two loops are in communication with the string, the instrumental box, and the balloon. When the balloon rises, the loops and the instrumental box move along the surface of the cone tower towards the upper portion of the cone tower through the opening in the sliding roof. At the top of the cone tower, the loops sequentially slip off the cone tower sequentially releasing the balloon and the instrumental box. Thus, the facility, according to the second embodiment of the invention, enables a launch of a sounding device into a free flight by means of two loops from the top of a cone tower partially disposed in a wind-shielding shelter.

In yet another aspect of the present invention, a method for launching an atmospheric sounding device according to the first embodiment of the present invention is disclosed. A cone tower and a loop fitted around the cone tower are provided. The sounding device includes an instrumental box connected to a balloon through a string. The loop is in communication with the instrumental box. When an operator gradually unfolds the string, the balloon rises pulling the loop and the instrumental box along the surface of the cone tower towards the upper portion of the cone tower. At the top of the cone tower, the loop slips off the cone tower releasing the instrumental box. Thus, the method, according to the first embodiment of the invention, allows the operator to launch a sounding device into a free flight from the top of a cone tower by means of a single loop without utilizing any external source of energy.

In yet another aspect of the present invention, another method for launching an atmospheric sounding device according to the second embodiment of the invention is disclosed. A cone tower and two loops fitted around the cone tower are provided. The loops are placed some distance apart from each other. The lower portion of the cone tower, with the loops, is placed inside a wind-shielding shelter having a sliding roof with an opening. The sounding device includes an instrumental box connected to a balloon through a string. The loops are in communication with the string. When an operator opens the sliding roof and gradually unfolds the string, the balloon rises pulling the loops and the instrumental box along the surface of the cone tower. The loops and the sounding device connected together move towards the upper portion of the cone tower through the opening. At the top of the cone tower, the loops sequentially slip off the cone tower sequentially releasing the balloon and the instrumental box.

Thus, the method according to the second embodiment of the invention allows an operator to launch a sounding device under strong winds in a safe and efficient manner by providing a wind-shielding shelter housing a cone tower with sliding loops, a balloon, and an instrumental box. The sounding device is launched into a free flight from the top of the cone tower by means of two loops without utilizing any external sources of energy and without exposing the operator to strong winds.

Other features and advantages of this present invention will become apparent from the following detailed description of the presently preferred embodiment of the present invention, taken in conjunction with the accompanying drawings.

DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION OF THE INVENTION

Reference throughout this specification to "a select embodiment," "one embodiment," or "an embodiment" means that a particular feature, structure, or characteristic described in connection with the embodiment is included in at least one embodiment of the present invention. Thus, appearances of the phrases "in one embodiment," or "in an embodiment" in various places throughout this specification are not necessarily referring to the same embodiment.

It will be readily understood that the components of the present invention, as generally described and illustrated in the Figures herein, may be arranged and designed in a wide variety of different configurations. Thus, the following detailed description of the embodiments of the apparatus and method of the present invention, as presented in the Figures, is not intended to limit the scope of the invention, as claimed, but is merely representative of selected embodiments of the invention.

Figure 1A:
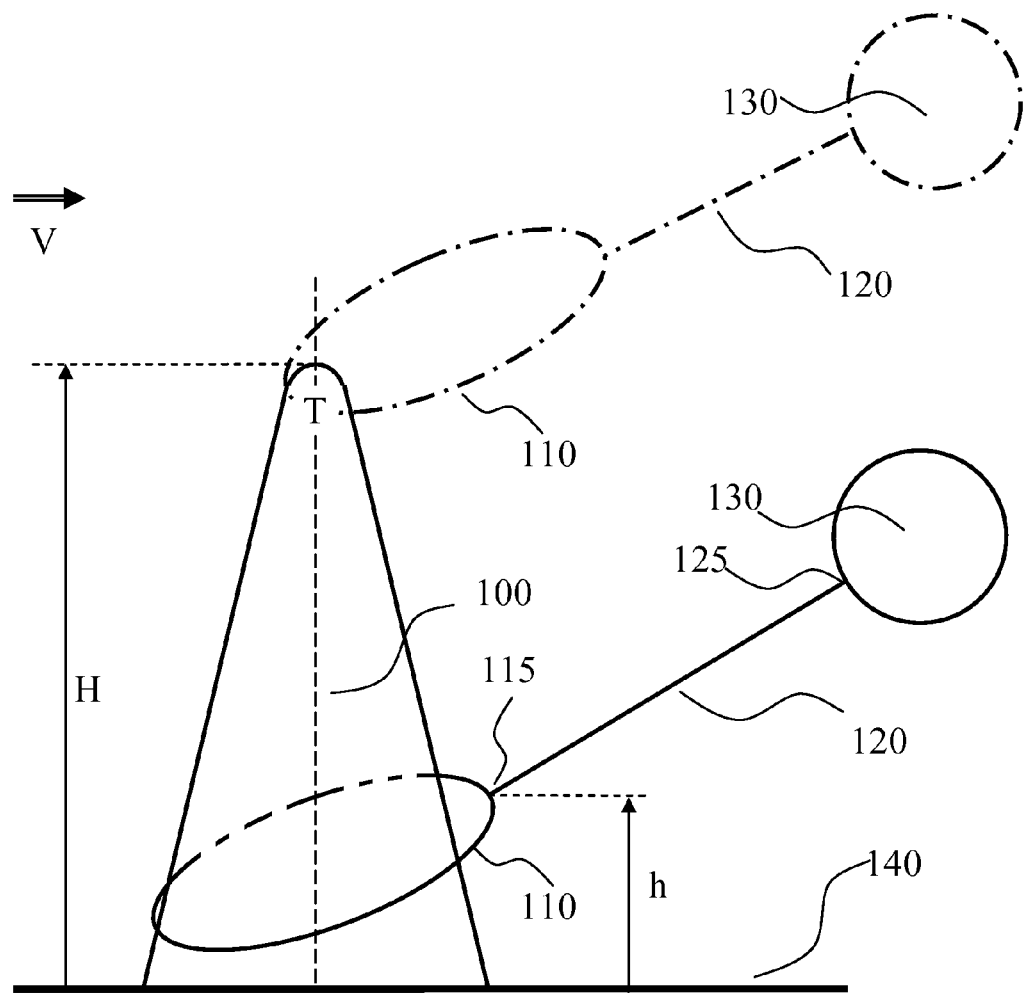
FIG. 1A shows a diagram illustrating an operating principle of the present invention.

FIG. 1A illustrates basic principals underlying movement of a loop 110 fitted around a cone tower 100 and sliding up along the surface of the cone tower 100. The cone tower 100 is installed on the ground 140. In one embodiment, the cone tower 100 is an empty cone tower with a smooth surface. By way of example and not limitation, the envelope of the cone can be solid or composed of a plurality of rods. In yet another embodiment, a transportable version of the cone tower 100 is made of an elastic airproof smooth material to be inflated at a launch site. A string 120 is attached to the loop 110 at a first end 115 and to an inflated balloon 130 at a second end 125. The string 120 tows the loop 110 up when the inflated balloon 130 rises in the air. By way of example and not limitation, the string 120 and the loop 110 are made of a composition of light and strong nylon, polyester, and polypropylene fibers. By way of example and not limitation the diameter of the loop 110 is approximately equal to the diameter of a base of the cone tower 100.

The loop 110 slides up along the smooth surface of the cone tower 100 from an initial height h up to the height H of the cone tower 100. The initial height h is selected such that an operator can reach the loop 110 at the height h to connect the loop 110 with the first end 115 of the string 120. In one embodiment, h is approximately 1.5-1.8 meter long. The height H of the cone tower 100 can take any value. In one embodiment, H is selected in the range of 10 to 15 meters.

The position of the loop 110, string 120 and balloon 130 prior to the loop 110 slipping off the top T of the cone tower 100 is shown in a dash-dotted line. In one embodiment, to facilitate smooth and unobstructed release of the loop 110 from the cone tower 100, the top portion T of the cone tower 100 may be of a round shape and smooth. The force moving the loop 110 up to the top T of the cone tower 100 is defined by a combination of a nozzle lift of the balloon 130 and the wind.

Figure 1B:
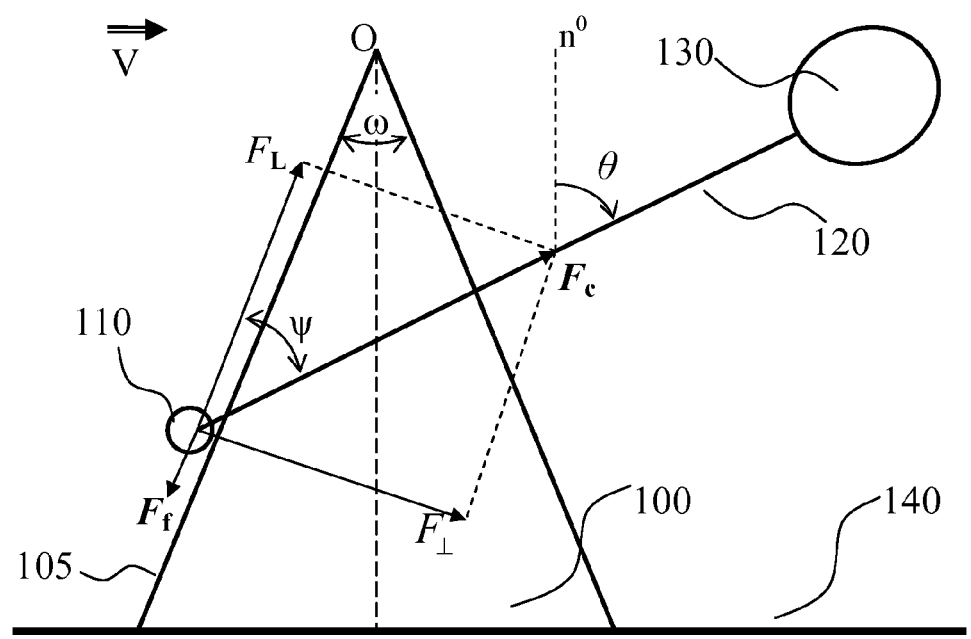
FIG. 1B shows a diagram illustrating forces acting on a loop that is fitted around a cone tower and pulled up along the surface of the cone tower by a string connected to an inflated rising balloon.

FIG. 1B shows a diagram illustrating forces acting on the loop 110 that is fitted around the cone tower 100 and pulled up by the string 120 under the wind blowing perpendicular to the axis of the cone tower 100 with the speed V. Although a real wind vector $\vec{V}$ may have both a horizontal and a vertical component, FIG. 1B shows the most probable case of strictly horizontal wind orientation dominating under strong winds in the lower layer of the atmosphere. More specifically, when the balloon 130 rises in the air, a tension force $F_c$ is applied to the loop 110 through the tightened string 120. The tension force $F_c$ presses a portion of the loop 110 to the windward side of the cone tower 100.

The tension force $F_c$ has two mutually perpendicular components. The first component $F_\perp = F_c \sin \psi$ is perpendicular to the windward lateral 105. The second component $F_L = F_c \cos \psi$ is parallel to the windward lateral 105 and directed towards the top T of the cone tower 100, wherein $\psi$ is an angle formed by the windward lateral 105 of the cone tower 100 and the tightened string 120. The angle $\psi$ can be expressed through angles $\theta$ and $\omega$ as follows:

$$\psi = \theta - \tfrac{1}{2}\omega, \qquad (1)$$

where $\theta$ is an angle between the string 120 and the vertical n°; $\omega$ is an opening angle of the cone tower 100. The angle $\theta$ increases with the wind speed V.

The normal component $F_\perp$ of the tension force $F_c$ causes a friction force between the sliding loop 110 and the surface of the cone tower 100. The friction force $F_f$ is parallel to the windward lateral 105 of the cone tower 100, directed opposite to the second component of the tension force, $F_L$, and can be calculated as $F_f = k_f F_\perp$, wherein $k_f$ is a friction factor. Since $F_\perp = F_c \sin \psi$ and based upon the equation (1), the larger is the angle $\omega$, the smaller is the friction force $F_f$.

Neglecting the gravity force acting on the sliding loop 110, a resulting force $F_{mov}$ applied to the loop 110 can be calculated as the difference between the second component of the tension force, $F_L$, and the friction force $F_f$, $F_{mov} = F_L - F_f$. Accordingly, the loop 110 slides up along the cone surface towards the top T of the cone tower if $F_{mov} > 0$. This condition is satisfied when $\cot \psi \geq k_f$. Adjusting the friction factor $k_f$, defined by friction properties of the loop 110 and the surface of the cone tower 100, to geometry of the cone tower 100, defined by the angle $\psi$ depending on the opening angle $\omega$, the condition $\cot \psi \geq k_f$ can be satisfied. Accordingly, a set of friction and geometrical parameters can be chosen to enable movement of the loop 110 up to the top T of the cone tower 100 at any given wind speed V, including high speeds characteristic to strong winds.

As follows from the expression (1), the angle $\psi$ is less than 90° even under very strong winds when the angle $\theta$ is close to 90°. When $\psi = 90° - \tfrac{1}{2}\omega$, the second component of the tension force $F_L = F_c \cos \psi$ is not yet equal to zero. If the condition $\cot \psi \geq k_f$ is satisfied, $F_L$ is still greater than the friction force $F_f$ and the force $F_{mov}$ pulls the loop 110 up to the top T of the cone tower 100. Accordingly, a large opening angle $\omega$ allows the loop 110 to move up to the top T of the cone tower 100 even under strong winds. In one embodiment, the opening angle $\omega$ is in the range of 5-10°. The condition $\cot \psi \geq k_f$ should be satisfied, primarily, by selection of a surface material of the cone tower 100 with a low friction factor $k_f$.

Figure 2A:
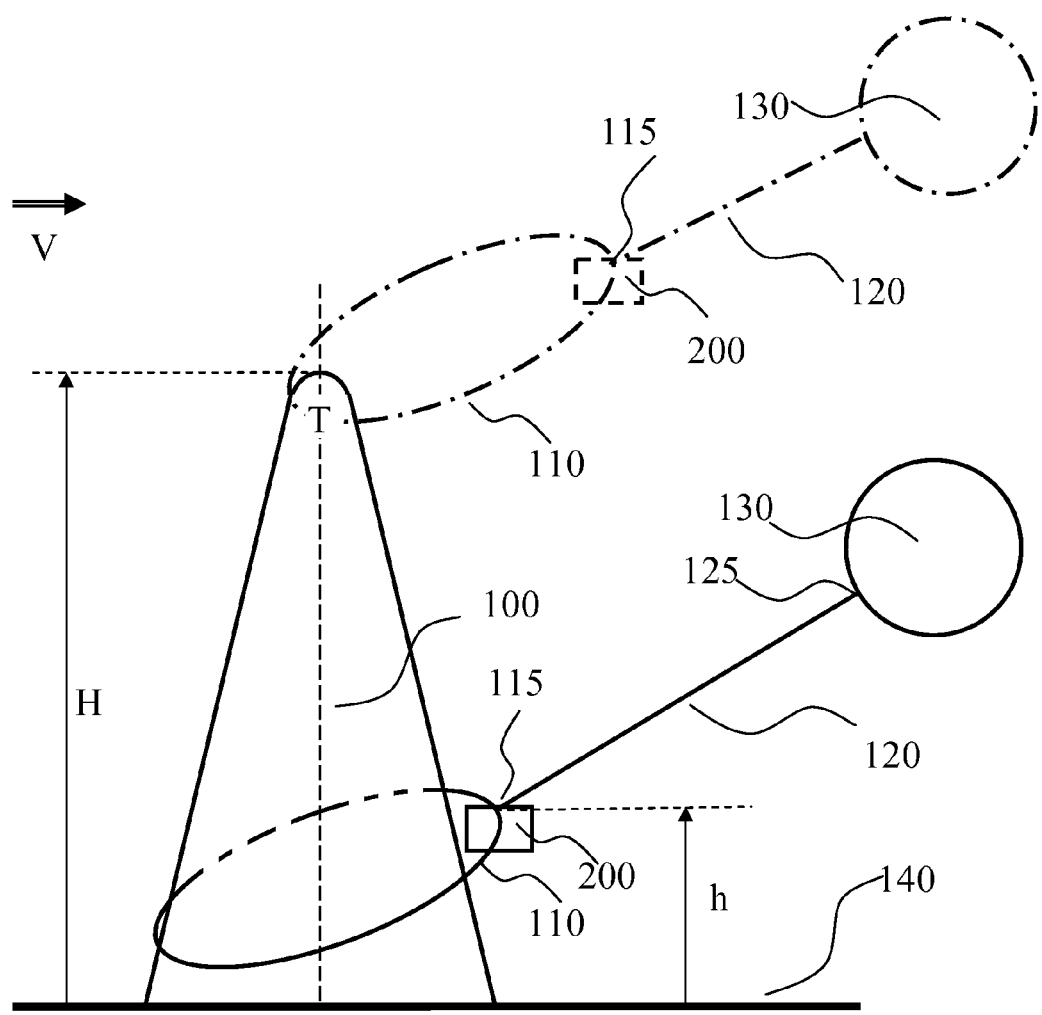
FIG. 2A shows a diagram illustrating an "elevated" launch of a sounding device from a ground-based facility, wherein the facility includes a cone tower engirded with one sliding loop, the sliding loop connected to elements of the sounding device at a single point.

FIG. 2A illustrates an "elevated" launch of an atmospheric sounding device (ASD). The term "elevated" launch hereinafter refers to releasing an instrumental box 200 from a height of above 10 meters. The ASD comprises the balloon 130 connected to the instrumental box 200 by the string 120. The launch preparation phase starts with an operator (not shown) fitting the loop 110 around the cone tower 100 at a height h. Next, the operator attaches the first end 115 of the string 120 at a single point to the loop 110 and to the instrumental box 200. For purposes of this description, in this and other embodiments of the present invention, the operator is located near the instrumental box 200. The second end 125 of the string 120 is attached to the inflated balloon 130. In one embodiment, the first end 115 of the string 120 is connected to the loop 110 and the instrumental box 200 on the leeward side of the cone tower 100. The length of the string 120 is defined by measurement requirements. In one embodiment, by way of example and not limitation, the length of the string 120 is in the range of 10-30 meters.

Prior to ASD launch, the operator holds the instrumental box 200 connected to the loop 110 and the string 120. To launch the ASD, the operator sets the instrumental box 200 free. The string 120 pulls the loop 110 and the instrumental box 200 up to the top T of the cone tower 100 when the inflated balloon 130 rises in the air. In this and other embodiments, the position of the loop 110, the instrumental box 200, the string 120, and the balloon 130 immediately before the loop 110 slips off the top T of the cone tower 100 is shown in a dash-dotted line.

In addition, the ASD may include a parachute (not shown) and a deleerer (not shown) that are located between the balloon 130 and the instrumental box 200. In this and other embodiments of the present invention, the parachute and deleerer may be included in the ASD. The instrumental box 200 includes electronics and sensors to collect atmospheric data and to transmit the data to a remote aerological station.

It is known the art to launch the ASD without using the cone tower 100. Specifically, the instrumental box 200 is released into a free flight from a relatively low height h equals of approximately to 1.5-2 meters. A successful launch of the ASD, in this case, can be achieved only under moderate winds with the wind speed not greater than approximately 12 m/s. However, a successful launch of the ASD under strong winds requires releasing the instrumental box 200 from a substantial height.

As noted above, prior to ASD launch, the operator holds the instrumental box 200 connected to the string 120. In absence of the cone tower 100 and under windless conditions, the string 120 connected to the balloon 130 is substantially vertical. However, the stronger is the wind the more the string 120 moves away from the vertical position and bends towards the ground 140. When the operator releases the instrumental box 200, the balloon 130 tows the instrumental box 200 by means of the string 120. At the same time, the instrumental box 200 moves towards the ground 140 under the gravity force till the string 120 connected to the rising balloon 130 takes the vertical position. If the distance between the balloon 130 and the ground 140 is greater than the length of the string 120 when the string 120 takes the vertical position, the instrumental box 200 starts rising together with the balloon 130. If the distance between the balloon 130 and the ground 140 is less than the length of the string 120, the instrumental box 200 hits the ground 140 and the ASD launch is terminated.

Accordingly, launch termination can occur when the instrumental box 200 is released at a low height h under the strong wind.

To avoid the collision between the instrumental box 200 and the ground 140 under strong winds, the cone tower 100 is used according to the present invention. Launching the ASD from the top T of the cone tower 100 results in increasing the distance between the ground 140 and the instrumental box 200 as well as between the ground 140 and the balloon 130 by the height H of the cone tower 100. Accordingly, selecting the cone tower 100 of a sufficient height H allows the instrumental box 200 to avoid collision with the ground 140 even under strong winds.

As shown in FIG. 2A, the instrumental box 200 is released into a free flight from the top T of the cone tower 100 having the height H that is much larger than the height h. By estimate, the cone tower having the height H of 10-15 meters enables a successful launch of the ASD under the maximum wind speed of approximately 25 m/s. This maximum wind speed equals twice the maximum speed of the wind under which a successful launch can be performed in absence of the cone tower 100, as described above.

Figure 2B:
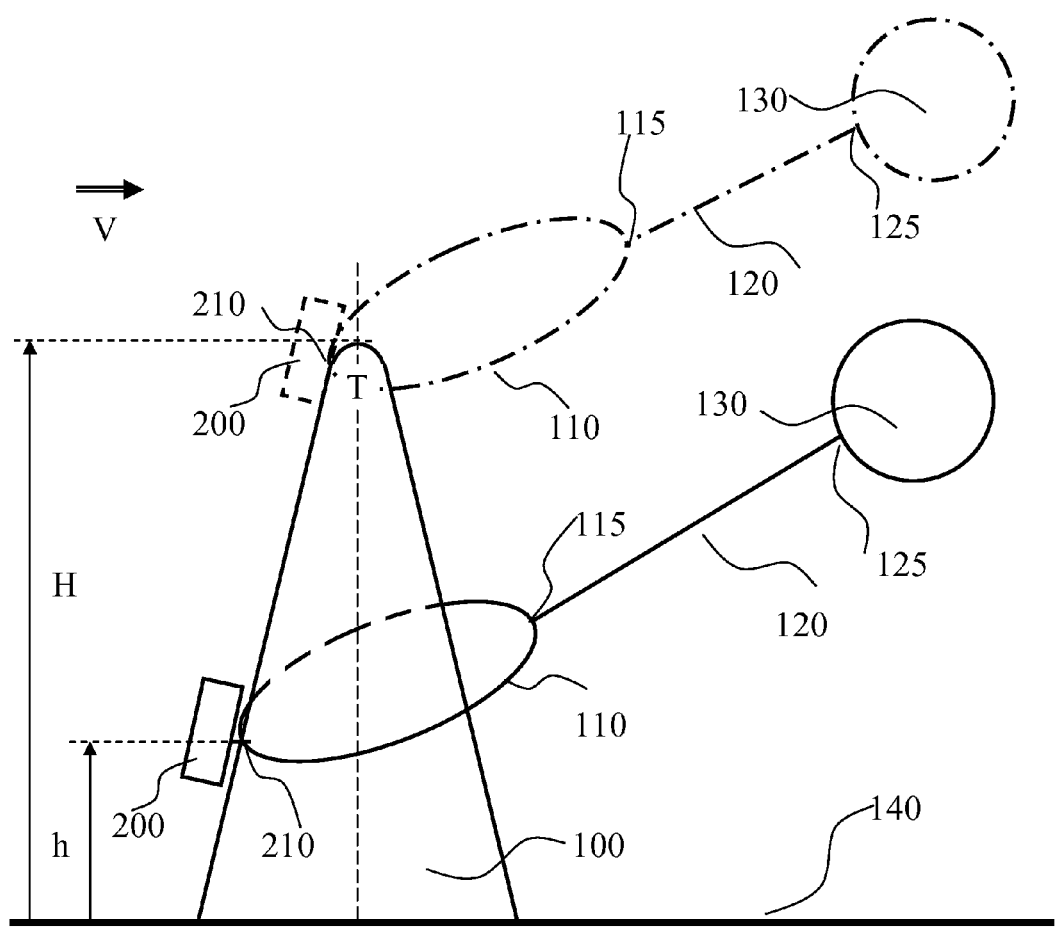
FIG. 2B shows a diagram illustrating an "elevated" launch of a sounding device from a ground-based facility, wherein the facility includes a cone tower engirded with one sliding loop, the sliding loop connected to elements of the sounding device at two diametrically opposite points.

FIG. 2B shows a diagram illustrating an "elevated" launch of the ASD according to yet another embodiment of the present invention. During the preparation phase, the operator attaches the sliding loop 110, fitted around the cone tower 100 at the height h, to the first end 115 of the string 120 on the leeward side of the cone tower 100. The instrumental box 200 is attached to the loop 110 at a point 210 on the windward side of the cone tower 100. A connection point of the loop 110 with the first end 115 of the string 120 and the point 210 are located at two diametrically opposite sides of the cone tower 100.

To launch the ASD, the operator sets the instrumental box 200 free. The string 120 tows the loop 110 and the instrumental box 200 up to the top T of the cone tower 100 when the inflated balloon 130 rises in the air. When the loop 110 slips off the top T of the cone tower 100, the instrumental box 200 is released into a free flight from the height H of the cone tower 100.

When the loop 110 slips off the top T of the cone tower 100, the loop 110 straitens. As result, the distance between the instrumental box 200 and the balloon 130 in a free flight becomes equal to the sum of the length of the string 120 and half of the circumference of the loop 110. In other words, the loop 110 serves as an element lifting the instrumental box 200 to the top T of the cone tower 100 prior to release of the instrumental box 200. Additionally, the loop 110 serves as a portion of the ASD, located between the string 120 and the instrumental box 200, after release of the instrumental box 200, e.g. while the ASD is in a free flight.

Similarly to the embodiment shown in FIG. 2A, the instrumental box 200 is released into a free flight from the top T of the cone tower 100 of a height H that is much larger than the height h. By estimate, the cone tower having the height H of 10-15 meters enables a successful launch of the ASD under the maximum wind speed of approximately 25 m/s. This maximum wind speed equals twice the maximum speed of the wind under which a successful launch can be performed in absence of the cone tower 100, as described above. As follows from the description above and FIG. 2A-2B, the launch of the ASD does not require utilizing any external source of energy and is enabled by a nozzle lift of the balloon 130 and the wind.

An aerological station includes a launch site where the cone tower 100 is disposed. To provide for a safe ASD launch, the launch site around the cone tower must be substantially free of objects that may possibly interfere with the launch. Under light and moderate winds a deviation of the string 120 from the vertical is small. Therefore, when the instrumental box 200 starts from the top T of the cone tower 100, the obstacles close and around the cone tower 100 located lower than the height H of the cone tower 100 do not interfere with the flight of the instrumental box 200. The obstacles located some distance, d, apart from the cone tower 100 do not interfere with the free flight of the ASD if they are located lower than height H from the cone tower 100 plus the distance the ASD has covered along the vertical by the time it has covered distance d in the horizontal direction. Accordingly, when the cone tower 100 is used for launching an ASD, the free space around the cone tower 100 is substantially smaller than the free space required for launching the ASD without the cone tower 100.

Figure 3A:
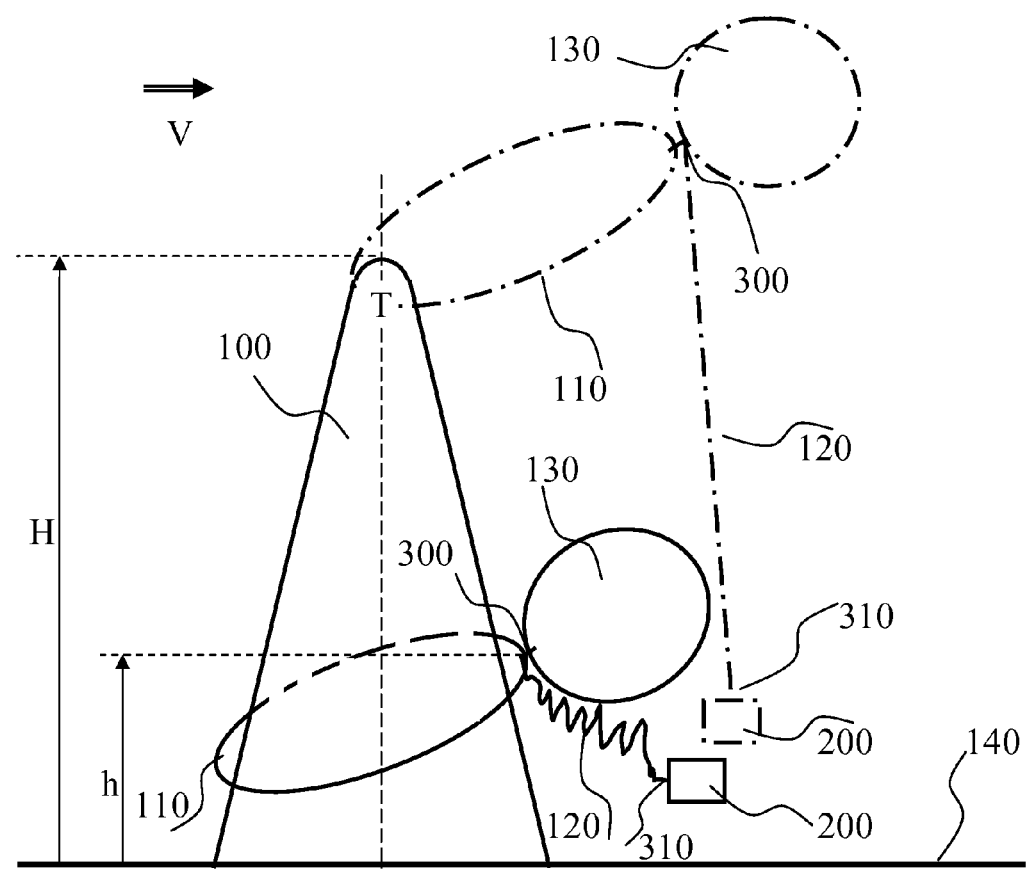
FIG. 3A shows a diagram illustrating a "vertical" launch of a sounding device from a ground-based facility, wherein the facility includes a cone tower engirded with one sliding loop, the sliding loop connected to elements of the sounding device at a single point according to yet another embodiment of the present invention.

FIG. 3A illustrates a "vertical" launch of an atmospheric sounding device (ASD). The term "vertical" launch hereinafter refers to releasing the ASD with the string 120 hanging substantially vertically down from the loop 110 when the loop 110 slips off the top T of the cone tower 100. The ASD comprises the balloon 130 connected to the instrumental box 200 by the string 120. Similarly to the embodiments described above, the launch preparation phase starts with an operator (not shown) fitting the loop 110 around the cone tower 100 at an initial height h. Next, the operator attaches the first end 300 of the string 120 at a single point to the loop 110 and to the inflated balloon 130. The second end 310 of the string 120 is attached to the instrumental box 200. In one embodiment, the first end 300 of the string 120 is connected to the loop 110 and to the inflated balloon 130 on the leeward side of the cone tower 100. The length of the string 120 is defined by measurement requirements, but cannot be longer than the difference between the height H of the cone tower 100 and the initial height h. In one embodiment, by way of example and not limitation, the actual length of the string 120 can be reduced during the launch to the length equal to D=H−h or smaller by a deleerer (not shown) incorporated into the string 120.

Prior to the launch, the operator holds with one hand the inflated balloon 130 connected to the loop 110 and to the first end 300 of the string 120. With the other hand, the operator holds the instrumental box 200. To launch the ASD, the operator sets the inflated balloon 130 free at the initial height h. The balloon 130 pulls the loop 110 and the first end 300 of the string 120 up to the top T of the cone tower 100. Immediately before the loop 110 slips off the top T of the cone tower 100, the operator sets the instrumental box 200 free at the initial height h.

It is known the art, to launch the ASD without using the cone tower 100. Specifically, the instrumental box 200 is released into a free flight when the declination of the string 120 from the vertical is relatively small. This declination is caused by the wind blowing on the balloon 130 connected with the string 120. In absence of the cone tower 100 and under substantially windless conditions, the string 120 connected to the balloon 130 is substantially vertical when the operator sets the balloon 130 free while holding the instrumental box 200.

However, the stronger is the wind the more the string 120 moves away from the vertical position and bends towards the ground 140. When the operator releases the instrumental box 200, the balloon 130 tows the instrumental box 200 by means of the string 120. At the same time, the instrumental box 200 moves towards the ground 140 under the gravity force till the string 120 connected to the rising balloon 130 takes the vertical position. If the distance between the balloon 130 and the ground 140 is greater than the length of the string 120 when the string 120 takes the vertical position, the instrumental box 200 starts rising together with the balloon 130. If the distance between the balloon 130 and the ground 140 is less than the length of the string 120, the instrumental box 200 hits the ground 140 and the ASD launch is terminated. Accordingly, launch termination can occur when the instrumental box 200 is released at a low initial height h under strong winds resulting in a large inclination angle. In one embodiment, by way of example and not limitation, a successful launch of the ASD, in absence of the cone tower 100, can be achieved only under moderate winds not exceeding 12 m/s, wherein the declination angle θ between the string 120 and the vertical n°, as shown in FIG. 1B, is not greater than 35°.

To avoid collision between the instrumental box 200 and the ground 140 under strong winds, the cone tower 100 is used according to the present invention. To enable the vertical orientation of the string 120 during the ASD launch, the instrumental box 200 is released at the initial height h immediately before the loop 110 slips off the top T of the cone tower 100. The distance between the balloon 130 and the ground 140, in this case, is greater than the length of the string 120. Accordingly, selecting the cone tower 100 of a sufficient height H, that is greater than the length of the string 120 by h, allows the instrumental box 200 to avoid collision with the ground 140 even under strong winds. As follows from the description above, the launch of the ASD from the height H of the cone tower 100 does not require utilizing any external source of energy and is enabled by a nozzle lift of the balloon 130 and the wind.

As shown in FIG. 3A, the instrumental box 200 is released into a free flight from the low initial height h when the balloon 130 slips off the top T of the cone tower 100 and the string 120 has substantially vertical orientation. By estimate, the cone tower having the height H of 10-15 meters enables a successful launch of the ASD under the maximum wind speed of approximately 25 m/s. This maximum wind speed equals twice the maximum speed of the wind under which a successful launch can be performed in absence of the cone tower 100, as described above.

Figure 3B:
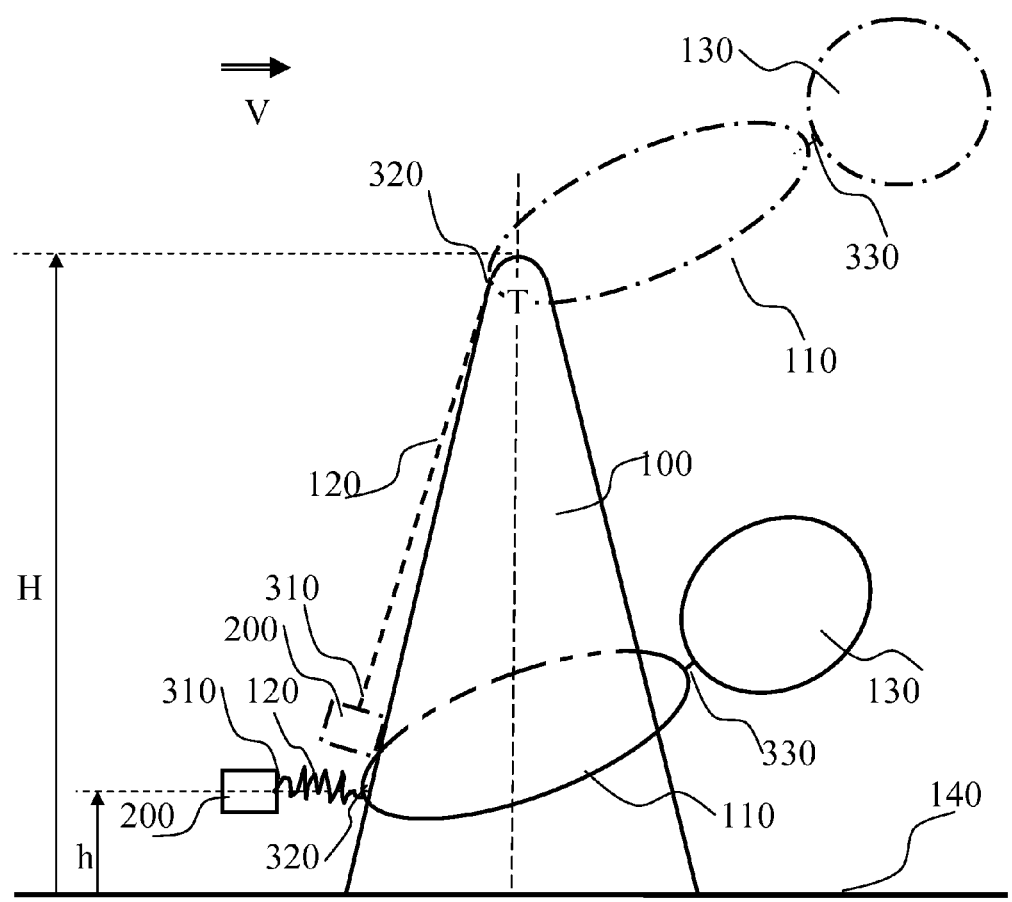
FIG. 3B shows a diagram illustrating a "vertical" launch of a sounding device from a ground-based facility, wherein the facility includes a cone tower engirded with one sliding loop, the sliding loop connected to elements of the sounding device at two diametrically opposite points.

FIG. 3B shows a diagram illustrating a "vertical" launch of the ASD according to yet another embodiment of the present invention. During the preparation phase, the operator attaches the loop 110, fitted around the cone tower 100 at an initial height h, to the first end 320 of the string 120 on the windward side of the cone tower 100. The instrumental box 200 is attached to the second end 310 of the string 120, also on the windward side of the cone tower 100. The inflated balloon 130 is attached to the loop 110 at a point 330 on the leeward side of the cone tower 100. A connection point of the loop 110 with the first end 320 of the string 120 and the point 330 are located at two diametrically opposite sides of the cone tower 100. The operator holds the instrumental box 200 and the first end 320 of the string 120 connected with the loop 110. The loop 110 is attached to the inflated balloon 130.

To launch the ASD, the operator sets the first end 320 of the string 120 and the loop 110 with the attached balloon 130 free. The balloon 130 tows the loop 110 and the first end 320 of the string 120 up to the top T of the cone tower 100. Immediately before the loop 110 slips off the top T of the cone tower 100, the operator releases the instrumental box 200 at the initial height h. The instrumental box 200 towed by the string 120 slides along the cone tower 100. The orientation of the string 120 during the ASD launch becomes close to vertical and the instrumental box 200 starts rising together with the balloon 130.

When the loop 110 slips off the top T of the cone tower 100, the loop 110 straitens. As result, the distance between the instrumental box 200 and the balloon 130 in a free flight becomes equal to the sum of the length of the string 120 and half of the circumference of the loop 110. The loop 110 serves as an element lifting the first end 320 of the string 120 to the top T of the cone tower 100 prior to release of the instrumental box 200. Additionally, the loop 110 serves as a portion of the ASD, located between the balloon 130 and the string 120, after release of the instrumental box 200, e.g. while the ASD is in a free flight. Similarly to the embodiment shown in FIG. 3A, the launch of the ASD does not require utilizing any external source of energy and is enabled by merely a nozzle lift of the balloon 130 and the wind.

Under light and moderate winds, the instrumental block 200 starts rising from a height h which is substantially less than the height H of the cone tower 100. When the instrumental block 200 starts rising, the string 120 is vertically oriented. Since the instrumental box 120 rises fast, it stays close to the cone tower 100. Obstacles some distance, d, apart from the launch site that are located lower than the height that the ASD has covered along the vertical by the time it has covered distance d in the horizontal direction. Accordingly, when the cone tower 100 is used for launching an ASD, the free required space around the cone tower 100 is substantially smaller than the free space required for launching the ASD without the cone tower 100.

Figure 4A:
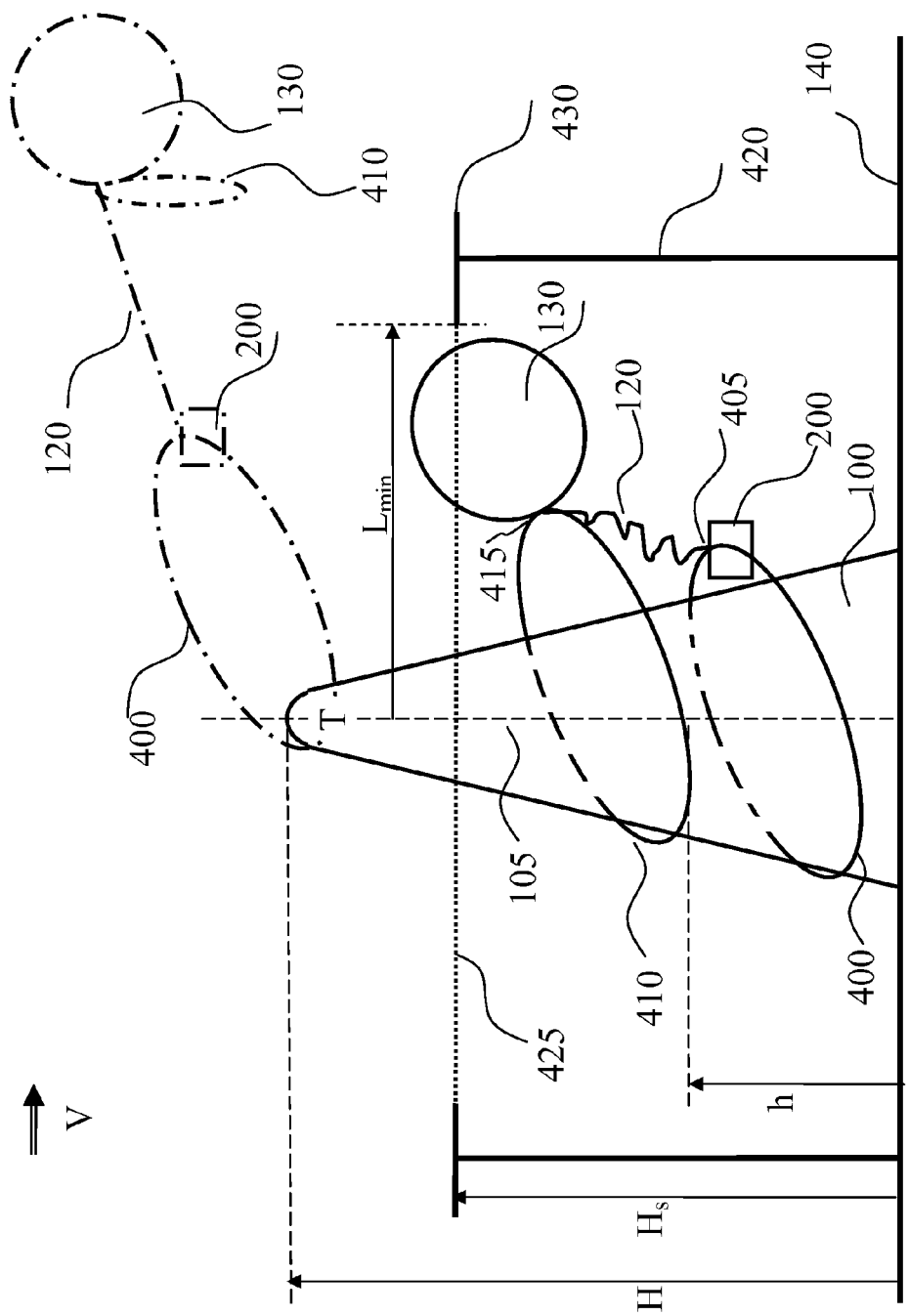
FIG. 4A shows a diagram illustrating a method for launching a sounding device from a wind-shielded ground-based facility, wherein the facility includes a cone tower engirded with two sliding loops, each sliding loop connected to elements of the sounding device at a single point.

The methods for launching an ASD, described above and illustrated in FIG. 2 and FIG. 3, provide for a successful launch of the ASD under a wide range of wind conditions. However, under severe weather conditions, the operator performing the launch may be exposed to the strong wind and precipitation. The strong wind and heavy precipitation make it difficult for the operator to connect ASD elements to a sliding loop. To protect the operator from the wind and precipitation before and during the launch operation, another method for launching the ASD is used according to yet another embodiment of the present invention the present invention, as shown in FIG. 4A.

A lower loop 400 and an upper loop 410 are fitted around the cone tower 100. In one embodiment, by way of example and not limitation, the lower and upper loops 400 and 410 have substantially the same circumference. The loops 400 and 410 are placed around an initial height h and some distance apart from each other. The loops 400 and 410 are in communication with the ASD. The lower portion of the cone tower 100, with the loops 400 and 410, is placed inside a windshielding shelter 420 having a sliding roof 430 with an opening 425. Similarly to FIG. 2 and FIG. 3, the ASD includes the instrumental box 200 connected to the inflated balloon 130 through the string 120. In one embodiment, the loops 400 and 410 are connected to the string 120 on the leeward side of the cone tower 100. The lower loop 400 is connected to the instrumental box 200 and to a first end 405 of the string 120. The upper loop 410 is connected to the balloon 130 and a second end 415 of the string 120. The two sliding loops 400 and 410 allow the balloon 130 and the instrumental box 200 to separately pass through the opening 425 in the sliding roof 430.

Prior to launch, the sliding roof 430 is tightly closed around the cone tower 100 such that no wind and precipitation penetrate the shelter 420. The operator connects elements of the ASD to the loops 400 and 410 inside the shelter 420 and is not exposed to the wind and precipitation. To launch the ASD, the operator opens the sliding roof 430, sets the balloon 130 free and gradually unfolds the string 120. However, protected by shielding walls of the shelter 420, the operator is not exposed to the wind. The balloon 130 rises pulling the upper loop 410 and the second end 415 of the string 120 along the surface of the cone tower 100 towards the upper portion of the cone tower 100 and through the opening 425.

The distance $L_{min}$, measured from a vertical axis 105 of the cone tower 100 to a nearest edge of the open roof 430, defines the minimal size of the opening 425. To allow the instrumental box 200 and the balloon 130 to freely pass through the opening 425, $L_{min}$ must be greater than the sum of half of the circumference of the loop 400 (or 410) and the diameter of the inflated balloon 130. Since the maximal horizontal extension of the balloon 130 from the vertical axis 105 of the cone tower 100 is less than $L_{min}$, the balloon 130 freely passes through the opening 425. The loop 410 holds the balloon 130 away from the edge of the open roof 430 under strong horizontal wind.

At the top T of the cone tower 100, the upper loop 410 slips off the cone tower 100 releasing the balloon 130. The rising balloon 130 strains the string 120. The lower loop 400 and the instrumental box 200, towed by the string 120, start moving along the surface of the cone tower 100 towards the upper portion of the cone tower 100 and through the opening 425. Since half of the circumference of the loop 400 is less than $L_{min}$, the lower loop 400 with the instrumental box 200 freely passes through the opening 425. The loop 400 holds the instrumental box 200 away from the edge of the open roof 430 under strong horizontal wind.

At the top T of the cone tower 100, the lower loop 400 slips off the cone tower 100 releasing the instrumental box 200. Accordingly, the loops 400 and 410 sequentially slip off the cone tower 100 releasing the ASD into a free flight.

As described above, the method shown in FIG. 4A allows the operator to launch an ASD under the strong wind from the top T of the cone tower 100 in a safe and efficient manner. Specifically, the wind-shielding shelter 420 housing the lower portion of the cone tower 100 with the sliding loops 400 and 410 attached to the ASD protects the operator from the wind and precipitation. Similarly to the embodiment shown in FIG. 3A, the ASD is launched into a free flight from the top T of the cone tower 100 to avoid collision of the instrumental box 200 with the ground 140 even under strong winds. In one embodiment, by way of example and not limitation, the height of the shelter $H_s$ equals 5 meters and the minimal size, $L_{min}$, of the opening 425 equals approximately 5-6 meters. The loops 400 and 410 enable the balloon 130 and instrumental box 200 to pass through the opening 425. At the same time, the loops 400 and 410 do not allow the wind to lay the balloon 130 and the instrumental box 200 down on the sliding roof 430.

Figure 4B:
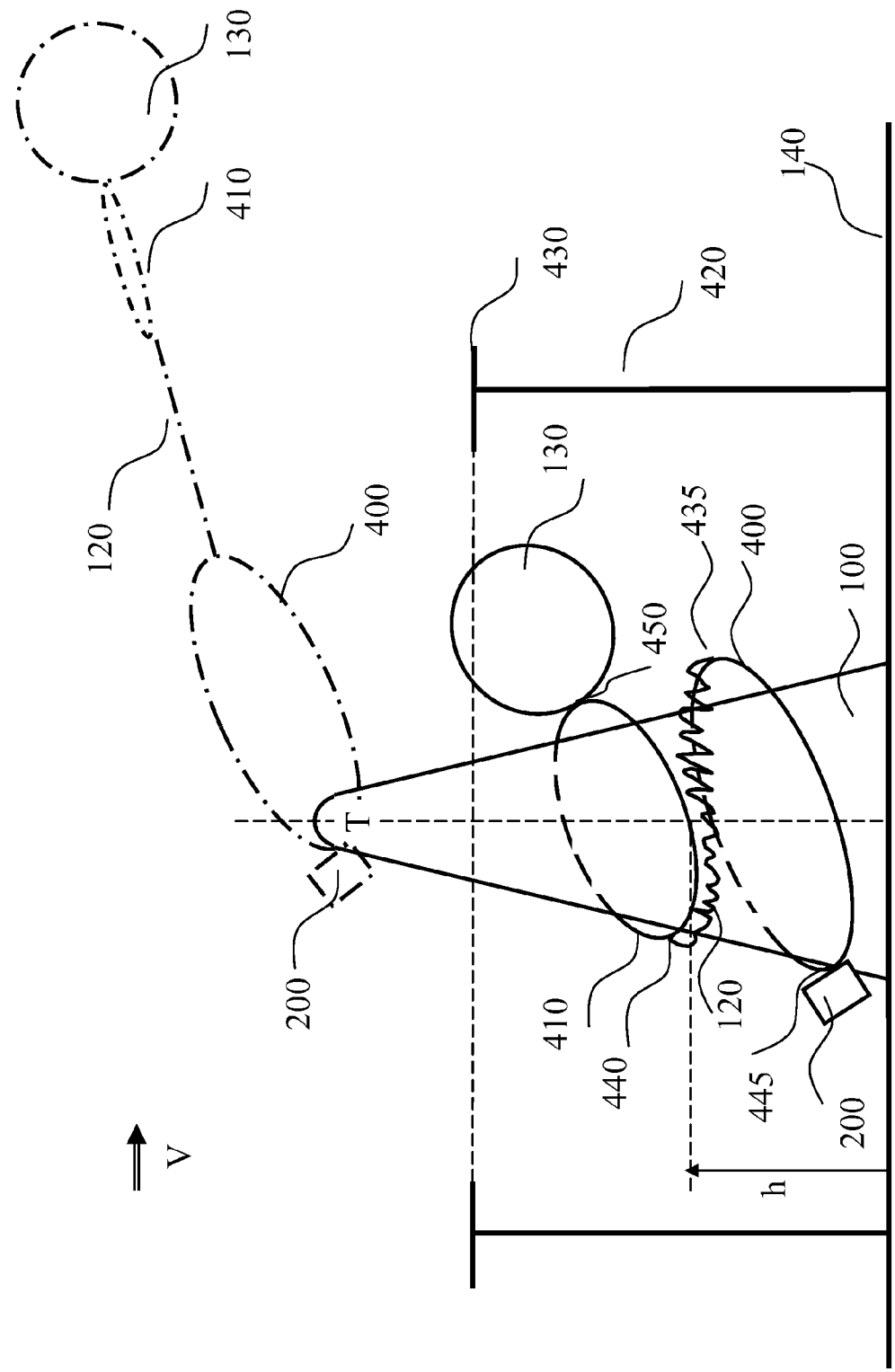
FIG. 4B shows a diagram illustrating a method for launching a sounding device from a wind-shielded ground-based facility, wherein the facility includes a cone tower engirded with two sliding loops, each sliding loop connected to elements of the sounding device at two diametrically opposite points.

FIG. 4B shows a diagram illustrating a launch of an ASD from the wind-shielding shelter 420 according to yet another embodiment of the present invention. Similarly to the embodiment shown in FIG. 4A, prior to the launch, the sliding roof 430 is tightly closed around the cone tower 100 such that no wind and precipitation penetrate the shelter 420. The operator connects elements of the ASD to the loops 400 and 410 inside the shelter 420. Specifically, the operator attaches the lower sliding loop 400, fitted around the cone tower 100, to the first end 435 of the string 120 on the leeward side of the cone tower 100. The instrumental box 200 is attached to the lower loop 400 at a point 445 on the windward side of the cone tower 100. The second end 440 of the string 120 is attached to the upper sliding loop 410 on the windward side of the cone tower 100. The inflated balloon 130 is connected to the upper sliding loop 410 on the leeward side of the cone tower 100 at a point 450. The loops 400 and 410 are placed approximately at the initial height h, some distance apart from each other. A connection point of the lower sliding loop 400 with a first end 435 of the string 120 and the connection point 445 are located at two diametrically opposite sides of the cone tower 100. Similarly, a connection point of the upper sliding loop 400 with the second end 440 of the string 120 and the connection point 450 are located at two diametrically opposite sides of the cone tower 100.

To launch the ASD, the operator opens the sliding roof 430, sets the balloon 130 free and gradually unfolds the string 120. The balloon 130 rises, pulling the upper loop 410 and the second end 440 of the string 120 along the surface of the cone tower 100 and through the opening 425. The loop 410 holds the balloon 130 away from the edge of the open roof 430 under strong horizontal wind.

At the top T of the cone tower 100, the upper loop 410 slips off the cone tower 100 releasing the balloon 130. The upper sliding loop 410 straitens together with the string 120. The lower loop 400 and the instrumental box 200, towed by the string 120, start moving along the surface of the cone tower 100 towards the upper portion of the cone tower 100 and through the opening 425. The loop 400 holds the instrumental box 200 away from the edge of the open roof 430 under strong horizontal wind.

At the top T of the cone tower 100, the lower loop 400 slips off the cone tower 100, straitens and releases the instrumental box 200. Thus, the loops 400 and 410 sequentially slip off the cone tower 100 releasing the ASD into a free flight. To avoid obstructions for the upper loop 410 with the inflated balloon 130 and the lower loop 410 with the instrumental box 200 passing the opening 425, $L_{min}$ must be greater than the sum of half of the circumference of the loop 400 (or 410) and the diameter of the inflated balloon 130.

When the loops 400 and 410 slip off the top T of the cone tower 100, the loops 400 and 410 straiten. As result, the distance between the instrumental box 200 and the balloon 130 in a free flight becomes equal to the sum of the length of the string 120 and half of the circumference of the loops 400 and 410. Accordingly, the distance between the balloon 130 and the instrumental box 200 is defined by the length of the string 120 and half of the circumference of the loops 410 and 400. In other words, the loops 410 and 400 serve as elements lifting the second end 440 of the string 120 and the instrumental box 200, respectively, to the top T of the cone tower 100 prior to release of the ASD into a free flight. Additionally, the loops 400 and 410 serve as portions of the ASD, located between the balloon 130 and the instrumental box 200, while the ASD is in a free flight. The loops 400 and 410 enable the balloon 130 and the instrumental box 200 to pass through the opening 425. At the same time, the loops 400 and 410 do not allow the wind to lay the balloon 130 and the instrumental box 200 down on the sliding roof 430.

The launch of the ASD according to the embodiment of the present invention shown in FIGS. 4A-B, does not require utilizing any external sources of energy and is enabled merely by a nozzle lift of the balloon 130 and the wind. Since the launch of the ASD as shown in FIGS. 4A-B is performed from the top T of the cone tower 100 for both the instrumental box 200 and inflated balloon 130, only "elevated" launch is used in conjunction with the shelter 420. During the launch preparation stage, the operator is protected from the wind and precipitation by the closed shelter 420. During the launch, when the roof 430 of the shelter 420 is opened and the ASD is already connected to the loops 400 and 410, the operator is protected from the wind by walls of the shelter 420 and is not affected by a strong towing force of the inflated balloon 130 caused by the strong wind.

According to the present invention, the primary function of the cone tower 100 is delivery of elements of an ASD to the top of the cone tower 100 to enable a successful launch of the ASD under strong winds. At the same time, in one embodiment, the cone tower 100 is used as housing for the antenna of radar or a telemetry system that is an element of any aerological station.

Figure 5A:
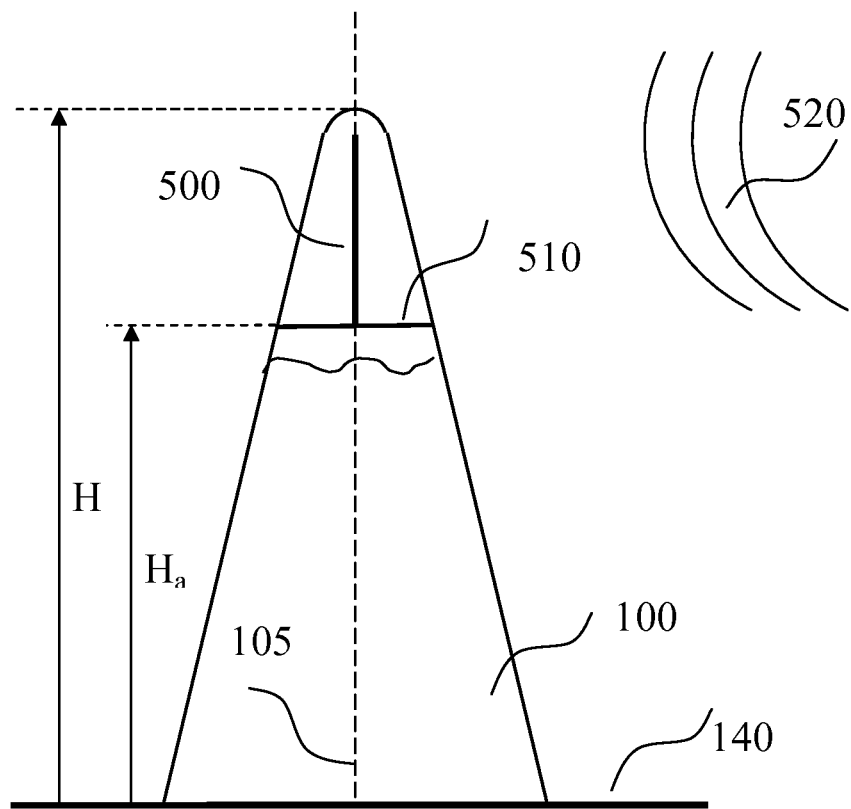
FIG. 5A shows a cone tower with a flagpole antenna of a telemetry system, wherein the flagpole antenna is disposed inside the upper portion of the cone tower.

FIG. 5A illustrates the cone tower 100 with a flagpole antenna 500 of a telemetry system that receives signals from the ASD. Specifically, the instrumental box receives signals from Global Positioning System (GPS) satellites, extracts the current position data of the ASD, and transmits this data together with the atmospheric data to a remote aerological station equipped with the flagpole antenna 500. In one embodiment, by way of example and not limitation, the size of a flagpole antenna 500 is 0.7-1 meter.

The flagpole antenna 500 installed inside the top portion of the cone tower 100 is positioned on a base 510 and oriented along a vertical axis 105. To receive electromagnetic waves 520 with the antenna 500 located inside of the cone tower 100, the portion of the cone tower 100 above the base 510 is made of a material transparent for Very High Frequency (VHF) electromagnetic waves. At the same time, this material has a low friction coefficient to allow the loop(s) shown in FIGS. 1-4 to slide along the surface of the cone tower 100. When the lower portion of the cone tower 100 is disposed inside the shelter 420, as shown in FIG. 4, the base 510 is located above the sliding roof 430.

In one embodiment, as shown in FIG. 5A, the flagpole antenna 500 is elevated to the height $H_a$ that is close to the height H of the cone tower 100. Such elevation of the antenna 500 enables better signal reception. Additionally, the flagpole antenna 500 is shielded from the precipitation and wind that enables extended service time of the antenna and easy maintenance. Accordingly, the cone tower 100 serves as a housing the antenna 500 of a telemetry system to receive telemetric data from a successfully launched ASD.

Figure 5B:
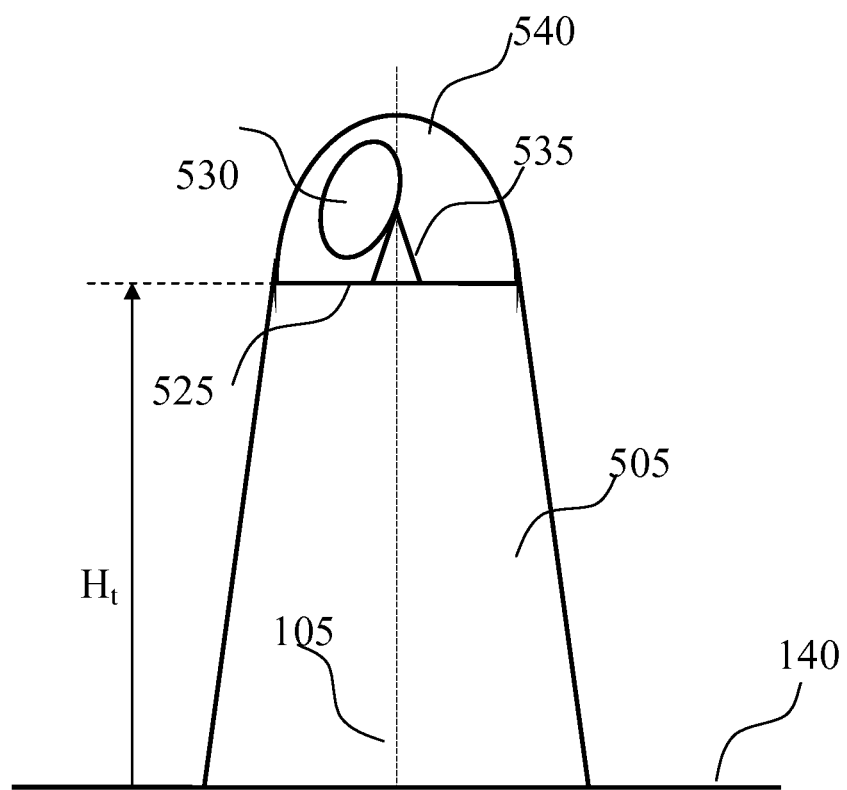
FIG. 5B shows a cone-spherical tower with a dish antenna of a telemetry system or radar, wherein the dish antenna is disposed inside a semispherical radome placed over a truncated cone tower.

FIG. 5B illustrates a dish antenna 530 of a telemetry system or radar installed on the top 525 of a truncated cone tower 505. In one embodiment, by way of example and not limitation, the diameter of the dish antenna 530 is about 1.5-2 meters; the diameter of the top portion 525 is about 2.5 meters; and the diameter of the base 545 is about 3-4 meters. A base 535 of the dish antenna 530 includes scanning mechanisms and is oriented along the vertical axis 105. The dish antenna 530 is covered with a semispherical radome 540. The radome 540 is made of a material transparent for Ultra High Frequency (UHF) electromagnetic waves. At the same time, this material has a low friction coefficient to allow the loop(s) shown in FIGS. 1-4 to slide along the surface of the cone tower 100. The truncated cone tower 505 and radome 540 join smoothly to enable the loop(s) shown in FIGS. 1-4 to slide along the surface of the tower structure. Thus, the radome, additionally serves as a sliding top of the truncated cone tower 505 to facilitate separation of the sliding loop(s) from the cone tower 505. The combination of the truncated cone tower 505 and the radome 540 presents a cone-spherical tower for launching the ASD and housing the dish antenna 530.

Similar to the embodiment shown in FIG. 5A, the dish antenna 530 is elevated to the height $H_t$ of the truncated cone tower 505. Such elevation of the antenna 530 enables better signal reception. Additionally, the antenna 500 is shielded from the precipitation and wind that enables extended service time of the antenna and easy maintenance. When the lower portion of the cone tower 100 is placed into the shelter 420, as shown in FIG. 4, the truncated cone tower 505 is configured to be higher than the sliding roof 430. Accordingly, the cone-spherical tower composed of the truncated cone tower 505 and the radome 540 serves as a housing the dish antenna 530 of a telemetry system to receive telemetric data from a successfully launched ASD.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

Advantages Over Prior Art

The system according to the present invention provides for releasing an atmospheric sounding device (ASD) under strong winds from a given height over the ground by utilizing a cone tower with sliding loop(s) and without using any external sources of energy and is enabled by merely a nozzle lift of the balloon and the wind. In one embodiment, when the cone tower is partially disposed inside a wind-shielding shelter, an operator performing the launch is protected from wind and precipitation. Being protected from the wind, the operator can complete the launch preparation unobstructed by the wind.

Furthermore, connecting the loops with elements of ASD according to the present invention provides for unobstructed release of the ASD by allowing the ASD freely pass through an opening in the roof of the shelter.

Furthermore, during a launch performed from the shelter, the operator is not affected by the strong tow force due to the inflated balloon rising in the air under strong wind. Furthermore, in addition to serving for lifting the ASD, the cone tower is used as a housing for antennas of telemetric/radar systems.

Accordingly, all features of the present invention enable a launch of an ASD in a wide range of surface winds including strong winds. Accordingly, aerological measurements can be conducted under severe weather conditions associated with areas affected by tropical cyclones, polar and sub-polar regions, and deserts.

Additionally, when the cone tower is used for launching the ASD under light or moderate winds, a required free space around the launch site is smaller than the free space required for launching the ASD without the cone tower. Accordingly, the area required for an aerological station employing the cone tower is substantially smaller than the area required for launching the ASD without the cone tower.

The invention claimed is:

1. A facility comprising:
   a cone tower;
   a sounding device including an instrumental box, a balloon, and a string, the instrumental box connected to the balloon through the string; and
   a loop in communication with the string, the loop fitted around the cone tower and configured to slide over a surface of the cone tower when the sounding device moves towards a top portion of the cone tower.

2. The facility of claim 1, further comprising an antenna embedded with the cone tower, said antenna receiving telemetric signals from the sounding device.

3. The facility of claim 1, wherein the loop is attached to a lower end of the string, the lower end of the string connected to the instrumental box.

4. The facility of claim 1, wherein the loop is attached to a lower end of the string at a first point and to the instrumental box at a second point, the first and second points being diametrically opposite.

5. A facility comprising:
   a cone tower placed inside a structure having a sliding roof with an opening;
   a sounding device including an instrumental box, a balloon, and a string, the instrumental box connected to the balloon through the string;

an upper loop and a lower loop in communication with the string, the upper and lower loops fitted around the cone tower and spaced apart, wherein the lower and upper loops slide over a surface of the cone tower when the sounding device moves towards the opening in the sliding roof.

6. The facility of claim 5, wherein the sliding roof has an open state and a closed state, the opening in the closed state fitted tight around the cone tower, the top portion of the cone tower rising over the roof, the sounding device exiting the structure through the opening in the open state.

7. The facility of claim 5, wherein a lower end of the string is attached to the instrumental box and to the lower loop at a first point of the lower loop; and an upper end of the string is attached to the balloon and to the upper loop at a first point of the upper loop.

8. The facility of claim 5, wherein a lower end of the string is attached to the lower loop at a first point of the lower loop and an upper end of the string is attached to the upper loop at a second point of the upper loop, the instrumental box is attached to the lower loop at a second point of the lower loop, and the balloon is attached to the upper loop at a first point of the upper loop, wherein the first and second points of the lower loop are diametrically opposite; and the first and second points of the upper loop are diametrically opposite.

9. A method for launching a sounding device comprising:
providing a cone tower;
providing the sounding device including an instrumental box connected to a balloon through a string;
providing a lower loop in communication with the string, the lower loop fitted around the cone tower to slide over a surface of the cone tower; and
unfolding the string, wherein the sounding device rises towards a top portion of the cone tower together with the lower loop.

10. The method of claim 9, further comprising attaching a lower loop to a lower end of the string, the lower end of the string connected to the instrumental box on a leeward side of the cone tower.

11. The method of claim 9, further comprising attaching a lower end of the string to the lower loop at a first point of the lower loop; attaching the instrumental box to the lower loop at a second point of the lower loop, wherein the first and second points of the lower loop are diametrically opposite and located on leeward and windward sides of the cone tower, respectively.

12. The method of claim 9, further comprising attaching a lower loop to an upper end of the string, the upper end of the string connected to the balloon, a lower end of the string connected to the instrumental box on a leeward side of the cone tower.

13. The method of claim 9, further comprising attaching an upper end of the string to the lower loop at a second point of the lower loop; attaching the balloon to the lower loop on a first point of the lower loop; attaching the lower end of the string to the instrumental box, wherein the first and second points of the lower loop are diametrically opposite and located on leeward and windward sides of the cone tower, respectively.

14. The method of claim 9, further comprising providing an upper loop in communication with the string, the upper loop fitted around the cone tower to slide over the surface of the cone tower, wherein the lower and upper loops are spaced apart.

15. The method of claim 14, further comprising providing a structure around the cone tower, the structure including a sliding roof with an opening, the sliding roof having an open state and a closed state; the opening in the closed state fitting tight around the cone tower with the top portion of the cone tower rising over the roof; the sounding device exiting the structure through the opening in the open state.

16. The method of claim 14, further comprising attaching a lower end of the string to an instrumental box and to the lower loop at a first point of the lower loop; and attaching an upper end of the string to the balloon and to the upper loop at the first point of the upper loop.

17. The method of claim 16, wherein the first point of the upper loop and the first point of the lower loop are located on a leeward side of the cone tower.

18. The method of claim 14, further comprising attaching a lower end of the string to the lower loop at a first point of the lower loop and attaching an upper end of the string to the upper loop at a second point of the upper loop; attaching the instrumental box to the lower loop on a second point of the lower loop, and attaching the balloon to the upper loop at a first point of the upper loop, wherein the first and second points of the lower loop are diametrically opposite; and the first and second points of the upper loop are diametrically opposite.

19. The method of claim 18, wherein the first point of the lower loop and the first point of the upper loop are located on a leeward side of the cone tower; and the second point of the lower loop and the second point of the upper loop are located on a windward side of the cone tower.

* * * * *